(12) United States Patent
Takahashi

(10) Patent No.: US 9,995,249 B2
(45) Date of Patent: Jun. 12, 2018

(54) INTAKE AND EXHAUST SYSTEM OF INTERNAL COMBUSTION ENGINE

(71) Applicant: HONDA MOTOR CO., LTD., Tokyo (JP)

(72) Inventor: Nobu Takahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/710,037

(22) Filed: Sep. 20, 2017

(65) Prior Publication Data

US 2018/0094574 A1    Apr. 5, 2018

(30) Foreign Application Priority Data

Oct. 3, 2016    (JP) .................................. 2016-195593

(51) Int. Cl.
| | |
|---|---|
| *F02M 26/06* | (2016.01) |
| *F02M 26/24* | (2016.01) |
| *F02B 47/10* | (2006.01) |
| *F02B 29/04* | (2006.01) |
| *F01P 3/22* | (2006.01) |
| *F02M 26/05* | (2016.01) |

(Continued)

(52) U.S. Cl.
CPC ............... *F02M 26/06* (2016.02); *F01P 3/22* (2013.01); *F02B 29/0443* (2013.01); *F02B 47/10* (2013.01); *F02M 26/05* (2016.02); *F02M 26/24* (2016.02); *F02B 29/0475* (2013.01); *F02M 26/19* (2016.02); *F02M 26/30* (2016.02)

(58) Field of Classification Search
CPC ........ F02M 26/06; F02M 26/24; F02M 26/25; F02M 26/28; F02M 26/32; F02B 47/10; F02B 29/0443; F02B 29/0475; F01P 3/22
USPC ..................................................... 123/568.12
See application file for complete search history.

(56) References Cited

U.S. PATENT DOCUMENTS 4,480,439 A  * 11/1984  Yamane .............. F02B 29/0443
                                                    123/563
6,301,890 B1 * 10/2001  Zeretzke ............... F01K 23/065
                                                    60/597

(Continued)

FOREIGN PATENT DOCUMENTS

JP         2013527369 A      6/2013
WO         2011136717 A1    11/2011

*Primary Examiner* — Mahmoud Gimie
(74) *Attorney, Agent, or Firm* — Armstrong Teasdale LLP

(57) ABSTRACT

An intake and exhaust system of an internal combustion engine includes an exhaust gas recirculation passage (35) communicates a part of an exhaust passage (7) downstream of a turbine with a part of an intake passage (6) upstream of a compressor and a cooling circuit (51), the cooling circuit including a first evaporator (52) provided in a part of the exhaust passage downstream of the turbine and upstream of a junction with the exhaust gas recirculation passage and storing a medium, an ejector pump (54) using vapor from the first evaporator as a driving flow, a condenser (57) for cooling and condensing the vapor ejected from the ejector pump and returning the condensed medium to the first evaporator, and a second evaporator (55) provided in the exhaust gas recirculation passage to cool the exhaust gas passing through the exhaust gas recirculation passage by evaporating a medium stored therein with a negative pressure created by the ejector pump.

5 Claims, 2 Drawing Sheets

(51) Int. Cl.
　　　*F02M 26/19*　　　(2016.01)
　　　*F02M 26/30*　　　(2016.01)

(56) References Cited

U.S. PATENT DOCUMENTS

| | | | | |
|---|---|---|---|---|
| 2011/0315130 A1* | 12/2011 | Kardos | ................... | F01N 3/023 |
| | | | | 123/568.12 |
| 2015/0121847 A1* | 5/2015 | Pursifull | ................... | F01N 5/02 |
| | | | | 60/274 |

* cited by examiner

INTAKE AND EXHAUST SYSTEM OF INTERNAL COMBUSTION ENGINE

TECHNICAL FIELD

The present invention relates to an intake and exhaust system of an internal combustion engine, and in particular to an intake and exhaust system including a cooling circuit in which exhaust gas is recirculated in an exhaust recirculation device.

BACKGROUND ART

As a method for suppressing knocking of an internal combustion engine, it is know to use an EGR (exhaust gas recirculation) device that mixes a part of the exhaust gas of an internal combustion engine with intake air as EGR gas, and forwards the mixture to the intake system of the internal combustion engine. Since knocking diminishes as the temperature of the gas fed to the intake system decreases, it is desirable to lower the temperature of the gas fed to the intake system as much as possible. Since the exhaust gas of the internal combustion engine is high in temperature, the EGR apparatus for performing such an EGR operation is often provided with an EGR cooler for cooling the exhaust gas.

When the EGR gas is cooled by an EGR cooler using the atmospheric air as the cooling medium, the EGR gas may not be adequately cooled when the temperature of the available air is excessively high. For this reason, it has been proposed to use a cooling circuit utilizing the thermal energy of the exhaust gas to cool the compressed intake air and/or the EGR gas fed to the internal combustion engine to a desired level. See JP2013-527369A, for instance.

According to this prior art, the cooling circuit includes a vapor generator (first evaporator), an evaporator (second evaporator), and an ejector pump. When the high temperature exhaust gas discharged from the internal combustion engine is passed through the first evaporator, the coolant stored in the first evaporator turns into high pressure vapor. By introducing the high pressure coolant into the ejector pump, the second evaporator is depressurized, and the internal temperature of the second evaporator is lowered. As the temperature of the second evaporator decreases, the compressed intake air and/or the EGR gas flowing through the interior of the second evaporator is cooled.

Also, when the temperature of the EGR gas is higher than the temperature of the intake air, the moisture contained in the EGR gas may condense as soon as the EGR gas is mixed with the intake air. Since the water droplets are harmful to the turbocharger of the internal combustion engine, it is necessary to cool the EGR gas to a temperature level lower than that of the intake air before mixing the EGR gas with the intake air. JP2013-527369A also discloses the provision of a second evaporator in a passage for feeding the EGR gas so that only the EGR gas is cooled.

JP2013-527369A describes a certain cooling circuit as a first embodiment, in which exhaust gas minus the EGR gas is passed through a first evaporator and the EGR gas is passed through a second evaporator. In this cooling circuit, since the EGR gas does not pass through the first evaporator, and flows directly into the second evaporator while still in a high temperature condition, there is a possibility that the EGR gas may not be sufficiently cooled when introduced into the second evaporator. Furthermore, JP2013-527369A discloses a slightly different cooling circuit as a second embodiment, in which the EGR gas is allowed to pass through a first evaporator, and the EGR gas that has passed through the first evaporator is then passed through a second evaporator. In this cooling circuit, since the gas passing through the first evaporator consists solely of the EGR gas, the thermal energy obtained in the first evaporator may not be sufficient for cooling the EGR gas passing through the second evaporator.

SUMMARY OF THE INVENTION

In view of such problems of the prior art, a primary object of the present invention is to provide an intake and exhaust system of an internal combustion engine provided with an EGR device that allows an adequate amount of thermal energy to be obtained in an evaporator, and the exhaust gas to be cooled and recirculated so that the EGR gas may be further cooled by using the thermal energy obtained in the evaporator.

The present invention accomplishes such an object by providing an intake and exhaust system of an internal combustion engine, comprising: an exhaust passage (7) connected to an engine main body (4) and provided with a turbine (25); an intake passage (6) connected to the engine main body and provided with a compressor (15) driven by the turbine; an exhaust gas recirculation passage (35) communicating a part of the exhaust passage downstream of the turbine with a part of the intake passage upstream of the compressor; and a cooling circuit (51) receiving heat from the exhaust gas passing through the exhaust passage and cooling the exhaust gas passing through the exhaust gas recirculation passage; wherein the cooling circuit comprises: a first evaporator (52) provided in a part of the exhaust passage downstream of the turbine and upstream of a junction with the exhaust gas recirculation passage and storing a medium that evaporates by heat received from the exhaust gas; an ejector pump (54) using vapor from the first evaporator as a driving flow; a condenser (57) for cooling and condensing the vapor ejected from the ejector pump and returning the condensed medium to the first evaporator; and a second evaporator (55) provided in the exhaust gas recirculation passage to store a medium therein and cool the exhaust gas passing through the exhaust gas recirculation passage by evaporating the medium stored therein with a negative pressure created by the ejector pump.

Thereby, an adequate amount of thermal energy can be obtained from the exhaust gas passing through the first evaporator. The temperature of the exhaust gas significantly drops as the exhaust gas passes through the first evaporator owing to the loss of the thermal energy by the exhaust gas in the first evaporator. Owing to the preliminary cooling of the exhaust gas in the first evaporator, the exhaust gas is adequately cooled by the second evaporator so that the temperature of the mixture supplied to the internal combustion engine is lowered, and knocking in the engine can be thereby favorably suppressed.

The intake and exhaust system may further comprise: a water injection device (82) for injecting water into a combustion chamber of the engine main body; and a water supply passage (83) for supplying water that has been cooled by the second evaporator and condensed in the exhaust gas recirculation passage to the water injection device.

The water that has condensed in the exhaust gas recirculation passage owing to the cooling action of the second evaporator can be supplied to the water injection device so that the need for any additional water source for the water injection device can be eliminated.

The intake and exhaust system may further comprise a water tank (81) provided in the water supply passage.

Thereby, an adequate amount of water can be supplied to the water ejection device at a required timing.

The intake and exhaust system may further comprise: a bypass passage (45) connecting an upstream end of the first evaporator with a downstream end of the first evaporator; and a bypass valve (46) for adjusting an amount of the exhaust gas that flows through the first evaporator.

Thereby, the amount of the exhaust gas that passes through the first evaporator may be adjusted in such a manner that the first evaporator is enabled to optimally cool the exhaust gas that passes through the first evaporator.

In the intake and exhaust system, the condenser may be connected to a radiator for cooling a cooling water of the engine main body.

By using the radiator for cooling the cooling water of the internal combustion engine for cooling the cooling water for the condenser, the system structure can be constructed in a both simple and economical way.

Thus, the present invention provides an intake and exhaust system of an internal combustion engine provided with an EGR device that allows an adequate amount of thermal energy to be obtained in an evaporator, and the exhaust gas to be cooled and recirculated so that the EGR gas may be further cooled by using the thermal energy obtained in the evaporator.

DESCRIPTION OF THE PREFERRED
EMBODIMENT(S)

An embodiment of the present invention is described in the following with reference to appended drawings.

Figure 1:
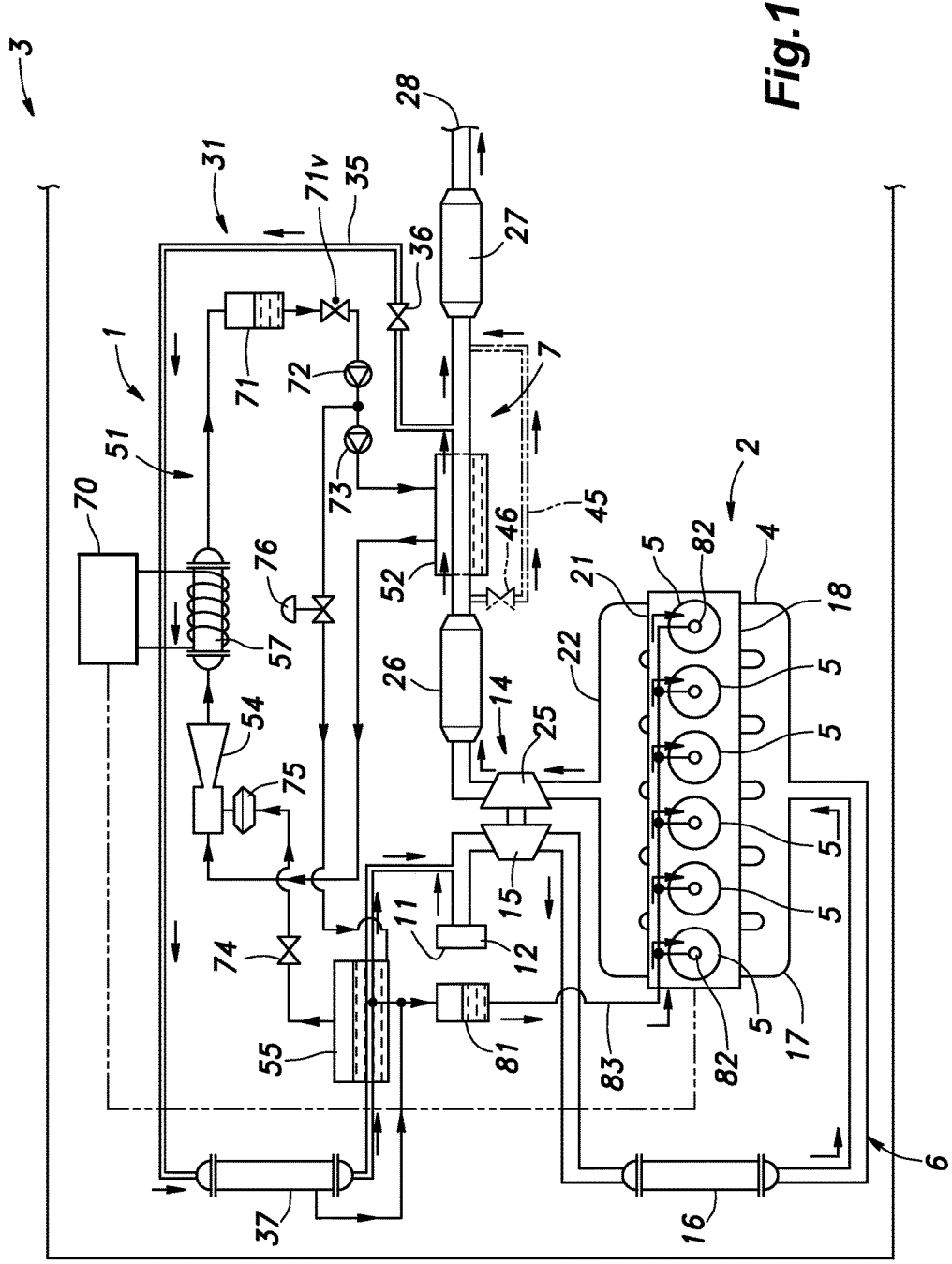
FIG. 1 is a piping diagram of an intake and exhaust system including a cooling circuit for exhaust gas in which the exhaust gas is recirculated in an exhaust recirculation device according to the present invention.

As shown in FIG. 1, an internal combustion engine 2 incorporated with an intake and exhaust system 1 embodying the present invention is mounted on a vehicle. The intake and exhaust system 1 is connected to a main body 4 of the internal combustion engine 2, and is provided with an intake passage 6 and an exhaust passage 7 communicating with cylinders 5 provided in the engine main body 4.

The intake passage 6 extends from an intake inlet 11 to an intake manifold 17 connected to the intake side of the engine main body 4 via an air cleaner 12, a compressor 15 of a turbocharger 14, and an intercooler 16 for cooling the intake air, in that order. The intake passage 6 branches off in the intake manifold 17, and communicates with intake ports 18 of the respective cylinders 5. In the following description of the intake system of the internal combustion engine 2, the terms "downstream" and "upstream" are used in regard to the flow direction of the intake air.

Exhaust ports 21 of the engine main body 4 converge into a single flow in an exhaust manifold 22 connected to the exhaust side of the engine main body 4, and an exhaust passage 7 of the engine main body 4 extends from the exhaust manifold 22 to an exhaust outlet 28 via a turbine 25 of the turbocharger 14, an exhaust gas purification device 26 that purifies the exhaust gas by an catalytic action and a muffler 27, in that order. In the following description of the exhaust system of the internal combustion engine 2, the terms "downstream" and "upstream" are used in regard to the flow direction of the exhaust gas.

The intake and exhaust system 1 is provided with an EGR device 31. The EGR device 31 is provided with an exhaust gas recirculation passage 35 that branches off from a part of the exhaust passage 7 on the downstream side of the turbine 25 and the exhaust gas purification device 26 in the exhaust passage 7, and on the upstream side of the muffler 27. The exhaust gas recirculation passage 35 passes through an EGR valve 36 and an EGR cooler 37 in this order, and is connected to a part of the intake passage 6 on the downstream side of the air cleaner 12 and on the upstream side of the compressor 15.

The exhaust gas discharged from the internal combustion engine 2 flows from the upstream end to the downstream end along the exhaust passage 7. The exhaust gas discharged from the exhaust manifold 22 flows into the turbine 25 and rotates the turbine 25. Having passed through the turbine 25, the exhaust gas is divided into an EGR gas flow flowing into the exhaust gas recirculation passage 35 and an exhaust gas flow flowing into the muffler 27 at a part of the exhaust passage 7 on the downstream side of the turbine 25 and the exhaust gas purification device 26 and on the upstream side of the muffler 27. The exhaust gas flowing into the muffler 27 is discharged from the exhaust outlet 28.

The EGR gas flows into the exhaust gas recirculation passage 35 through the EGR valve 36. As the exhaust gas flowing into the exhaust gas recirculation passage 35 travels along the passage, the exhaust gas is cooled by air or water in the EGR cooler 37, and is introduced into a part of the intake passage 6 on the downstream side of the air cleaner 12 and on the upstream side of the compressor 15. The EGR gas flowing into the intake passage 6 is mixed with the fresh air introduced from the intake inlet 11 and cleaned by the air cleaner 12. The mixed gas flows along the intake passage 6, and enters the compressor 15 to be compressed by the compressor 15 driven by the rotation of the turbine 25. The compressed mixed gas is cooled by the intercooler 16, and branched off to the intake ports 18 of the respective cylinders 5 via the intake manifold 17. As described above, the EGR device 31 mixes a prescribed amount of the exhaust gas into the fresh air that is introduced into the cylinders 5. As a result, the concentration of oxygen in the intake air is decreased by a corresponding amount, and the combustion temperature decreases accordingly so that the occurrence of knocking is suppressed.

The EGR device 31, in this case, consists of a so-called low-pressure EGR device in which the upstream side of the compressor 15 and the downstream side of the turbine 25 are connected to each other by the exhaust gas recirculation passage 35. The low pressure EGR device has an advantage that the EGR gas can be introduced into the intake passage 6 without being influenced by the supercharging pressure as compared with the high pressure EGR device in which the downstream side of the compressor 15 and the upstream side of the turbine 25 are connected to each other by an exhaust gas recirculation passage.

The intake and exhaust system 1 is provided with a cooling circuit 51 for cooling the EGR gas. The cooling circuit 51 includes a first evaporator 52 for storing a medium which turns into vapor by the heat received from the exhaust gas, an ejector pump 54 connected to the first evaporator 52 and using the vapor from the first evaporator 52 as a driving flow, a second evaporator 55 placed under a negative pressure condition by the negative pressure produced by the ejector pump 54, and a condenser 57 connected to the ejector pump 54 for cooling the medium discharged from the ejector pump 54 to a condensation temperature.

The first evaporator 52 is disposed downstream of the turbine 25 and the exhaust gas purification device 26 in the exhaust passage 7, and is provided on the upstream side of a junction between the exhaust passage 7 and the exhaust gas recirculation passage 35. The exhaust passage 7 extends through the inside of the first evaporator 52 so that the exhaust gas passing through the exhaust passage 7 exchanges heat with the medium stored in the first evaporator 52. More specifically, as a high temperature exhaust gas passes through the pipe passing through the inside of the first evaporator 52, the medium stored in the first evaporator 52 receives heat therefrom.

The medium stored in the first evaporator 52 turns into vapor due to the heat received from the exhaust gas. In particular, since the first evaporator 52 is provided upstream of the junction between the exhaust passage 7 and the exhaust gas recirculation passage 35, all of the exhaust gas discharged from the internal combustion engine 2 passes through the inside of the first evaporator 52. Therefore, the first evaporator 52 can receive a sufficient amount of heat from the exhaust gas discharged from the internal combustion engine 2. As the medium stored in the first evaporator 52 receives a sufficient amount of heat from the exhaust gas, the temperature of the medium reaches the evaporation temperature, and the medium evaporates. The pressure of the interior of the first evaporator 52 rises owing to the evaporation of the medium. The medium evaporated to a high pressure is forwarded to the ejector pump 54. At the same time, since the heat in the exhaust gas is absorbed by the medium stored in the first evaporator 52, the temperature of the exhaust gas is lowered.

In the present embodiment, water is used as the medium to be stored in the first evaporator 52. Water has the advantage of having a large latent heat of vaporization and being harmless.

Figure 2:
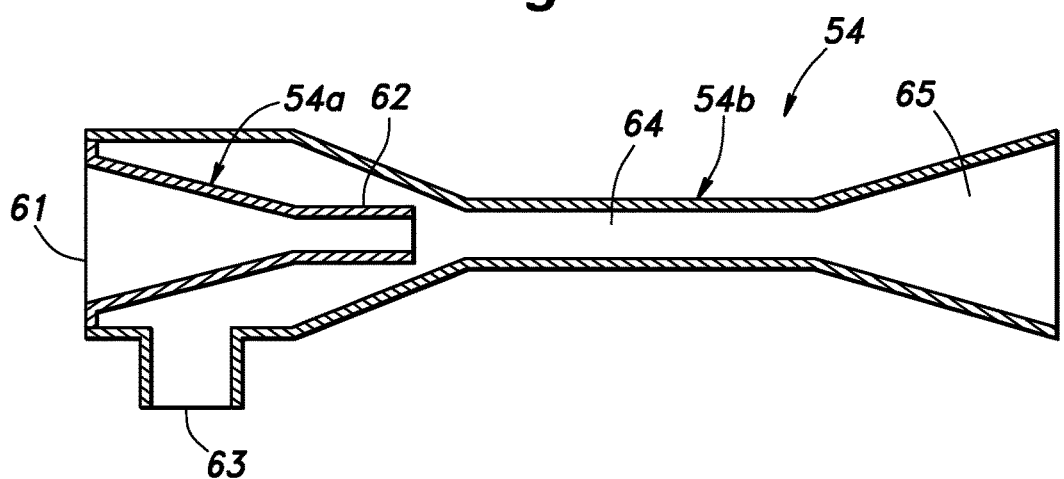
FIG. 2 is a sectional view of an ejector pump used in the intake and exhaust system.

As shown in FIG. 2, the ejector pump 54 includes an inner tube 54a defining a driving flow inlet 61 in an upstream end thereof and a nozzle 62 formed as a throttle portion communicating with the flow inlet 61. The ejector pump 54 further includes an outer tube 54b coaxially receiving the inner tube 54a therein and defining a suction port 63 in an upstream end thereof, a mixing section 64 for mixing the first medium having a high flow velocity ejected from the nozzle 62 and the second medium sucked from the suction port 63, and an expansion section 65 connected to the downstream end of the mixing section 64 and provided with a tubular shape whose inner diameter progressively increases toward the downstream end of the outer tube 54b. The first medium at a high pressure supplied to the ejector pump 54 flows from the driving flow inlet 61 of the ejector pump 54 and reaches the mixing section 64 through the nozzle 62 consisting of a throttle portion. As the cross sectional area of the inner tube 54a progressively decreases toward the outlet of the nozzle 62, the flow speed of the first medium passing through the outlet of the nozzle 62 increases, and, in this embodiment, reaches a supersonic speed. The pressure of the medium in the vicinity of the outlet of the nozzle 62 decreases due to the venturi effect, and creates a negative pressure. Therefore, the second medium is drawn into the mixing section 64, and then flows into the expansion section 65. Once the first medium exits the expansion section 65, the pressure of the first medium increases while the flow velocity of the first medium decreases. The mixed medium that has passed through the expansion section 65 is forwarded to the condenser 57.

It is preferable to configure the nozzle 62 so that the medium undergoes an isentropic adiabatic expansion in the ejector pump 54, instead of an isenthalpic adiabatic free expansion. By undergoing an isentropic adiabatic expansion, a higher energy efficiency can be achieved owing to the recovery of entropy that can be used for the work performed by the ejector pump 54.

The medium forwarded to the condenser 57 is cooled by a cooling fan or cooling water as it passes through the interior of the condenser 57, and condenses inside the condenser 57. In this conjunction, a radiator 70 may be provided so that the cooling water circulates between the condenser 57 and the radiator 70. Alternatively, as indicated by the phantom line, the radiator 70 for cooling the cooling water of the engine main body 4 may be connected to the condenser 57 for cooling the medium. In this case, since the existing radiator 70 is used to cool the cooling water whose temperature has been raised by the condenser 57, there is no need to add a radiator 70 for cooling the condenser 57, and the overall structure is simplified.

The medium condensed by the condenser 57 is forwarded to a reservoir tank 71. The lower end of the reservoir tank 71 is connected to the first evaporator 52 via a valve 71v, an auxiliary pump 72 and a liquid level holding pump 73 in this order. The medium, which is in liquid form in the reservoir tank 71, is returned to the first evaporator 52 by operating the auxiliary pump 72 and the liquid level holding pump 73.

A second evaporator 55 is provided in a part of the exhaust gas recirculation passage 35 located between the EGR cooler 37 and the junction with the intake passage 6 so that the part of the exhaust gas fed to the intake passage 6 is passed through a heat transfer pipe of the second evaporator 55 to be used as a heating medium. The second evaporator 55 stores therein the same medium as the first evaporator 52, and this medium obtains heat from the medium flowing through the heat transfer pipe.

The second evaporator 55 is connected at its upper part to the suction port 63 provided in a lower part of the mixing section 64 of the ejector pump 54 via a suction amount adjusting valve 74 and a demister 75 for removing oil mist. As the high pressure medium flowing into the driving flow inlet 61 of the ejector pump 54 creates a negative pressure in the mixing section 64, the second evaporator 55 connected to the mixing section 64 via the suction port 63 is depressurized. At the same time as the second evaporator 55 is depressurized, the temperature of the medium inside the second evaporator 55 decreases. When the temperature of the medium inside the second evaporator 55 decreases, the EGR gas passing through the exhaust gas recirculation passage 35 passing through the heat transfer pipe of the second evaporator 55 is cooled.

A lower part of the second evaporator 55 is connected to the junction between the auxiliary pump 72 and the liquid level holding pump 73 via a liquid level holding valve 76. Since the second evaporator 55 is depressurized by the ejector pump 54, the medium inside the second evaporator 55 evaporates, and the amount of the medium inside the second evaporator 55 decreases. If required, the auxiliary pump 72 is driven, and the liquid level holding valve 76 is opened so that the medium is supplied from the reservoir tank 71 to the second evaporator 55.

The medium stored in the first evaporator 52 is evaporated by the heat of the exhaust gas of the internal combustion engine 2, and the pressure of the medium rises. When the high pressure medium enters the ejector pump 54, the second evaporator 55 is depressurized. The EGR gas is cooled owing to the pressure drop in the second evaporator 55. The medium delivered from the ejector pump 54 turns into liquid in the condenser 57, and is returned to the first evaporator 52. As described above, the internal combustion engine 2 is provided with the first evaporator 52, the ejector pump 54, the second evaporator 55, and the condenser 57 so that the cooling circuit 51 for cooling the EGR gas by receiving heat from the discharged exhaust gas is formed.

The internal combustion engine 2 further includes a condensed water recovery tank 81 connected to the EGR cooler 37 and a part of the exhaust gas recirculation passage 35 passing through the second evaporator 55 for recovering and storing the water that condenses in the EGR cooler 37 and the second evaporator 55. A lower part of the condensed water recovery tank 81 is connected to water injection devices 82 provided in the respective cylinders 5 via a water supply passage 83. Each water injection device 82 is configured to inject the water supplied from the condensed water recovery tank 81 into the corresponding cylinder 5 as required.

The mode of operation of the intake and exhaust system 1 including the EGR device 31 having the cooling circuit 51 for recirculating exhaust gas will be described in the following. The medium stored in the reservoir tank 71 is returned back to the reservoir tank 71 by circulating via the auxiliary pump 72, the liquid level holding pump 73, the first evaporator 52, the ejector pump 54 and the condenser 57, or via the auxiliary pump 72, the liquid level holding valve 76, the second evaporator 55, the suction amount adjusting valve 74, the demister 75, the ejector pump 54, and the condenser 57. Thus, a closed circuit involving neither an inflow nor an outflow of the medium is formed.

By receiving heat from the exhaust gas discharged from the internal combustion engine 2, the medium evaporates in the first evaporator 52, and acquires a high pressure. The medium consisting of high pressure vapor is introduced into the ejector pump 54 to thereby depressurize the second evaporator 55. The EGR gas is cooled by the pressure drop in the second evaporator 55. The medium delivered from the ejector pump 54 turns into liquid in the condenser 57, and is returned to the first evaporator 52.

As described above, the internal combustion engine 2 is provided with the first evaporator 52, the ejector pump 54, the second evaporator 55 and the condenser 57 so that the cooling circuit 51 is formed for cooling the EGR gas by supplying the heat obtained from the exhaust gas discharged from the internal combustion engine 2 to the first evaporator 52. Since the cooling circuit 51 derives the heat or the energy required for the operation thereof from the exhaust gas, the need for an additional power source for driving the cooling circuit 51 is eliminated. Furthermore, since the heat of the exhaust gas which is otherwise released to the atmosphere is utilized for driving the cooling circuit 51, the energy efficiency can be improved.

It is conceivable to configure the cooling circuit 51 such that the first evaporator 52 is connected between the muffler 27 and the junction between the exhaust passage 7 and the exhaust gas recirculation passage 35. However, in this case, the exhaust gas minus the EGR gas passes through the first evaporator 52, and only the EGR gas passes through the second evaporator 55. On the other hand, in the illustrated embodiment, the EGR gas that is passed through the second evaporator 55 is already cooled in the first evaporator 52. Therefore, the temperature of the EGR gas entering the second evaporator 55 is lower in the present embodiment than in this alternate arrangement so that the present embodiment is able to further lower the temperature of the EGR gas that has passed through the second evaporator 55 than the alternate arrangement.

It is also conceivable to configure the cooling circuit 51 such that the first evaporator 52 is connected between muffler 27 and the junction between the EGR valve 36 and the EGR cooler 37. However, in this case, only the EGR gas passes through the first evaporator 52, and then through the second evaporator 55. On the other hand, in the illustrated embodiment, all of the exhaust gas discharged from the internal combustion engine 2 passes through the first evaporator 52 so that the first evaporator 52 can receive much more heat. Therefore, the pressure of the medium evaporating from the first evaporator 52 is further increased, and the second evaporator 55 is placed in a strong negative pressure owing to the first evaporator 52. Therefore, the EGR gas passing through the second evaporator 55 is further cooled and its temperature is lowered further.

Generally, the exhaust gas of an internal combustion engine 2 contains a large amount of moisture generated by combustion of fuel. Therefore, when the EGR gas is cooled, the moisture contained in the EGR gas condenses. When the EGR gas passes through the EGR cooler 37, the moisture contained in the EGR gas condenses into water. Also when the EGR gas passes through the second evaporator 55, the moisture contained in the EGR gas is cooled by the second evaporator 55 so that the moisture further condenses into water. The condensed water flows into the condensed water recovery tank 81 and is stored therein. The stored water is conveyed to the water injection device 82 via the water supply passage 83, and the water is sprayed into the cylinders 5 when required. Therefore, water can be sprayed into the cylinders 5 without requiring any external water source. By spraying water into the cylinders 5, the combustion temperature is lowered so that NOx generation and knocking are suppressed. Further, since the water for spraying is stored in the condensed water recovery tank 81, it is possible for the water injection device 82 to spray an appropriate amount of water into the combustion chambers at an appropriate timing.

Although a specific embodiment has been described above, the present invention is not limited to the above described embodiment, but can be modified in a number of different ways. For instance, a bypass passage 45 extending from the junction between the exhaust gas purification device 26 and the first evaporator 52 to the junction between the first evaporator 52 and the muffler 27 in the exhaust passage 7 may be provided as indicated by the imaginary lines in FIG. 1. The bypass passage 45 is provided with a bypass valve 46 for continuously adjusting the amount of the exhaust gas passing through the bypass passage 45.

By using the bypass valve 46 provided in the bypass passage 45, the amount of the exhaust gas flowing into the first evaporator 52 can be adjusted. If the amount of the exhaust gas flowing into the first evaporator 52 is decreased, the temperature of the exhaust gas exiting the first evaporator 52 may decrease. In that case, the temperature of the EGR gas passing through the exhaust gas recirculation passage 35 and entering the second evaporator 55 also decreases. As a result, the EGR gas having a lower temperature may be supplied to the engine main body 4 by means of the negative pressure created by the ejector pump 54.

As the amount of the exhaust gas passing through the bypass passage 45 decreases, the energy received by the first evaporator 52 also decreases so that the negative pressure created by the ejector pump 54 may decrease. As the negative pressure of the ejector pump 54 decreases, the energy given up by the medium in the second evaporator 55 also decreases. Therefore, even if the temperature of the EGR gas flowing into the second evaporator 55 is low, there is a possibility that the temperature of the EGR gas exiting the second evaporator 55 may not be reduced sufficiently because the EGR gas may not be sufficiently cooled by the cooling circuit 51. In such a case, the opening of the EGR valve 36 may be increased while the opening of the bypass valve 46 is decreased.

There may be a case where not only the opening of the EGR valve 36 is required to be adjusted but also the opening of the bypass valve 46 must be also adjusted in order to secure a sufficient amount of EGR gas depending on the load applied to the internal combustion engine 2. If the opening of the EGR valve 36 and the opening of the bypass valve 46 are correlated depending on the system configuration, the opening of the bypass valve 46 and the opening of the EGR valve 36 may be controlled in a mutually coordinated fashion by configuring the control unit for the cooling circuit 51 accordingly.

The invention claimed is:

1. An intake and exhaust system of an internal combustion engine, comprising:
   an exhaust passage connected to an engine main body and provided with a turbine;
   an intake passage connected to the engine main body and provided with a compressor driven by the turbine;
   an exhaust gas recirculation passage communicating a part of the exhaust passage downstream of the turbine with a part of the intake passage upstream of the compressor; and
   a cooling circuit receiving heat from the exhaust gas passing through the exhaust passage and cooling the exhaust gas passing through the exhaust gas recirculation passage;
   wherein the cooling circuit comprises:
   a first evaporator provided in a part of the exhaust passage downstream of the turbine and upstream of a junction with the exhaust gas recirculation passage and storing a medium that evaporates by heat received from the exhaust gas;
   an ejector pump using vapor from the first evaporator as a driving flow;
   a condenser for cooling and condensing the vapor ejected from the ejector pump and returning the condensed medium to the first evaporator; and
   a second evaporator provided in the exhaust gas recirculation passage to store a medium therein and cool the exhaust gas passing through the exhaust gas recirculation passage by evaporating the medium stored therein with a negative pressure created by the ejector pump.

2. The intake and exhaust system of an internal combustion engine according to claim 1, further comprising:
   a water injection device for injecting water into a combustion chamber of the engine main body; and
   a water supply passage for supplying water that has been cooled by the second evaporator and condensed in the exhaust gas recirculation passage to the water injection device.

3. The intake and exhaust system of an internal combustion engine according to claim 2, further comprising a water tank provided in the water supply passage.

4. The intake and exhaust system of an internal combustion engine according to claim 1, further comprising:
   a bypass passage connecting an upstream end of the first evaporator with a downstream end of the first evaporator; and
   a bypass valve for adjusting an amount of the exhaust gas that flows through the first evaporator.

5. The intake and exhaust system of an internal combustion engine according to claim 1, wherein the condenser is connected to a radiator for cooling a cooling water of the engine main body.

* * * * *